Patented Jan. 3, 1928.

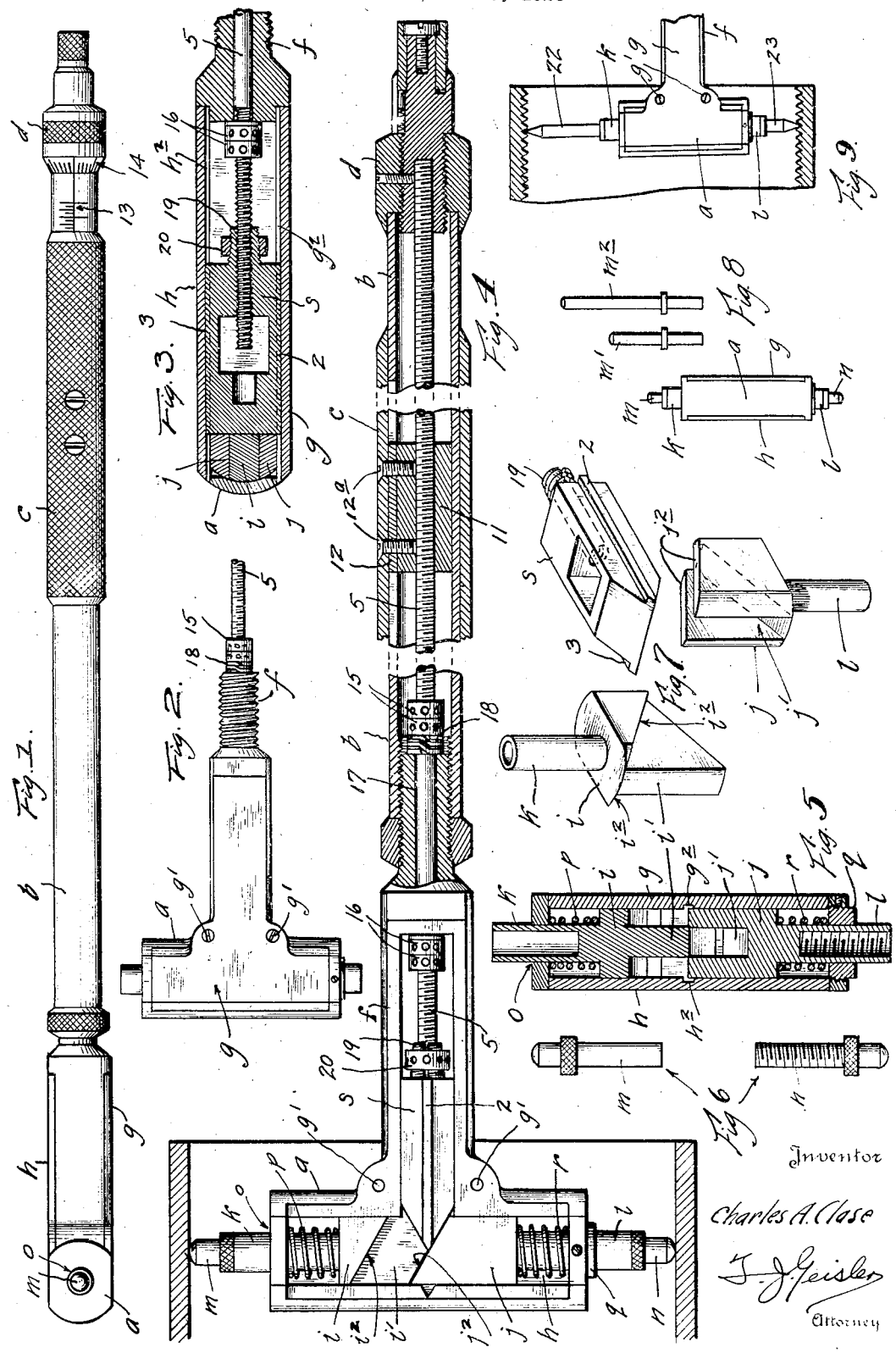

1,655,133

UNITED STATES PATENT OFFICE.

CHARLES A. CLASE, OF PORTLAND, OREGON.

INSIDE MICROMETER GAUGE.

Application filed November 9, 1926. Serial No. 147,252.

My invention relates to micrometer calipers, especially intended for measuring inside diameters or dimensions in more or less inaccessible places, such as are found in various kinds of machinery, for example, bearings, valves, or cylinders.

At present, inside micrometers commonly in use to my knowledge are provided with a handle at right angles to the measuring head, and on which the operating thimble and sleeve are mounted, are operated either by means of a pair of bevel gears, one fixed to the micrometer screw and the other at right angles therewith, or by means of a micrometer screw provided with a cone-shaped end which is forced between two beveled contact pins, located in the measuring head.

The disadvantage of these types of micrometers is, that there is always a small amount of lost motion between the two intermeshed beveled gears in the one type, and in the other type the spindle is provided with a cone-shaped end, and thus there is only a limited contact surface, which tends to introduce slight wear, sufficient to affect the accuracy of the micrometer, since these measuring instruments are used considerably, and in both cases an error in measurement tends to be created.

Micrometer calipers are required to measure diameters within at least .001 of an inch, and as high as .0001 of an inch, so that any error such as .0001 of an inch, due to lost motion of bevel gears, or to the uneven advancement of the contact pins will destroy the effectiveness of these inside micrometer calipers. Furthermore this error, as slight as it is, tends to be cumulative; and for this reason inside micrometers provided with an operating handle at right angles to the measuring head have never been popular among those who use them.

The principal object of my invention is to provide an inside micrometer caliper in which the limit of error will be so small as to be negligible in the most accurate of measurements, even to .0001 of an inch.

A further object of my invention is to provide an inside micrometer with which the diameters, or dimensions, of more or less inaccessible places may be conveniently reached and accurately measured.

A further object of my invention is so to construct my micrometer that it covers a larger range of measurements than the instruments formerly in use; and to further extend this range to a considerable degree by providing removable contact points of different lengths.

A still further object is to provide an inside micrometer which will be efficient, accurate and simply constructed.

I attain these objects with an inside micrometer gauge comprising a hollow T-head provided with two companion gauge-slides located in the cross-piece of said T-head, said gauge-slides provided with tongue and groove at their inner ends, respectively, and said inner ends further provided with oblique faces, respectively, adapted to form a V-shaped separation opening between said inner ends at one side; and a complementary slide, longitudinally movable in the stem of said T-head and provided with a wedge-end, rectangular in cross-section, said wedge-end bearing against said oblique inner-end faces of the gauge-slides and being adapted to move the gauge-slides proportionately to the movement imparted to the complementary slide, the T-head having removable side walls, these side walls and the complementary slide being provided with cooperating means for restraining the movement of the latter to a plane transverse to the apex of said V-shaped opening between the gauge-slides, the movement of the gauge-slides being restrained to a plane transverse to the plane of movement of said complementary slide. Said gauge-slides are provided with hollow extensions projecting through the ends of said T-head, said extensions adapted to have contact-points removably mounted thereon, and a plurality of contact points of varying length adapted to be interchangeably mounted on said extensions, and coil springs mounted on said extensions of the gauge-slides within said T-head, normally holding the gauge-slides in retracted position and thereby their oblique inner-end faces in constant contact with the angular faces of said wedge-end of the complementary slide, and a hollow handle provided with means for advancing and retracting the complementary slide relatively to a micrometer scale.

These and other objects and further details of construction and the mode of operation of my invention will hereinafter be explained and described with reference to the accompanying drawings, in which:

Fig. 1 shows a side elevation of my micrometer and the sleeve and operating thimble, mounted on the handle, and the graduations provided thereon;

Fig. 2 shows a front elevation of my micrometer with the handle and contact points removed and shows one of the removable sections in place which are provided on each side of the measuring head;

Fig. 3 shows a transverse longitudinal section taken on a central line of the stem of the measuring head, showing the details of construction;

Fig. 4 shows a central longitudinal section of the handle of my micrometer, and the details of construction contained within the measuring head are shown by the removal of one of the removable sections provided on the measuring head, and also illustrates how my micrometer will be used for measuring an inside diameter;

Fig. 5 shows a central longitudinal section of the measuring head taken on a plane normal to the handle and illustrates further details of construction;

Fig. 6 shows an elevation of the two removable contact points one of which is threaded;

Fig. 7 shows a perspective view of the inter-acting gauge slides and the cylindrical extensions provided with recesses adapted for receiving the contact points, and the complementary slide provided with a wedge-end;

Fig. 8 shows an end elevation of the head of my micrometer and contact points of different lengths which may be substituted in the cylindrical extensions of the inter-acting gauge-slides; and Fig. 9 shows a front elevation of the head of my micrometer provided with contact points adapted for measuring the depths of the thread on the interior of a cylindrical surface.

My micrometer comprises a T-shaped measuring head $a$ provided with a tubular handle $b$ threaded on a stem $f$ of the T-head $a$ and a sleeve $c$ mounted for longitudinal movement over the handle and an operating thimble $d$ mounted for rotation on the end of the said handle.

The T head $a$ is hollow and partially cylindrical, and is provided with removable sections $g$ and $h$ on each side, which are flat and held in place by screws as at $g'$ for inspection, cleaning, and lubrication of the parts contained in the head.

Axially arranged within the cross-piece of the T-head $a$ are inter-acting gauge slides $i$ and $j$, the member $i$ being provided with a triangular tongue $i'$ which is received in a triangular groove $j'$ formed by the sides of the gauge slide $j$.

The interior face $j^2$ of the gauge-slide $j$ is formed at an oblique angle with the said gauge-slide and the interior face $i^2$ of the gauge-slide $i$ is formed at a complementary angle, in other words, the sides are parallel.

The exterior faces of both the gauge-slides $i$ and $j$ are provided with outstanding cylindrical extensions $k$ and $l$ respectively, each extension being recessed to receive the removable contact points $m$ and $n$, and the extension $l$ is threaded to receive the contact point $n$ which is also threaded and intended to be more or less permanently retained, as the points $m'$ and $m^2$, Fig. 8, of different lengths will be substituted in the extension $k$.

The inner surface of the T-head $a$ is partially cylindrical, the sections $g$ and $h$ are plane surfaces and fit flush within the head so that the interior and exterior sides of the head $a$ are parallel and the gauge-slides $i$ and $j$ are of similar cross-sections and adapted to fit therein and are held against rotary movement by the said sections.

One end of the T-head $a$ is partially closed except for a centrally located hole $o$ through which the extension $k$ extends and the compression coil spring $p$ is mounted over the extension and bears between the inner surface of the end of the head $a$ and the gauge-slide.

The other end of the head $a$ is open and the bushing $q$ is threaded therein through which the extension $l$ extends and a similar spring $r$ is mounted over the extension $l$ as on the extension $k$.

The inner surface of the stem $f$ of the T-head is rectangular in cross-section and a complementary slide $s$ which is also rectangular in cross-section, and which is provided with a wedge-end $t$, is arranged therein with the edge of the wedge-end $t$ transverse of the head, and located so as to coincide with the V-shaped space formed by interior faces of the gauge-slides $i$ and $j$.

The complementary slide $s$ is also provided with central longitudinal ribs 2 and 3 on the sides adjacent the removable sections $g$ and $h$ which are provided with central longitudinal grooves $g^2$ and $h^2$ in their inner surfaces in which the ribs 2 and 3 are received and which serve as guides for the gauge-slide $s$.

A micrometer screw 5 is threaded into the complementary slide $s$ and is journaled in the handle and extends therethrough to the operating thimble $d$ to which it is fixed and which is mounted over the end of the handle. A square hole is provided in approximately the center of the complementary slide $s$ into which the end of the micrometer screw 5 extends, thus affording a means for collecting accumulated dirt within the head and reducing the friction on the end of the screw 5.

Lock nuts 15 and 16 are provided on the micrometer screw 5 to hold the said screw in its journal 17 against free longitudinal movement and a spring 18 is provided between the lock nuts 15 and the end of the stem to provide sufficient resilience along the screw 5 in order to prevent backlash.

A tapered and threaded split neck 19 is provided on the end of the complementary slide s and a nut 20 is threaded over the said neck, so any possible wear on the portion of the micrometer screw 5 which is threaded into the member s may be taken up by screwing the nut 20 down on the neck 19.

The operation and use of my inside micrometer is as follows:

The contact points m and n will be advanced by rotating the operating thimble d which will also rotate the micrometer screw 5 and the complementary slide s in which the said screw is threaded will be advanced and the wedge-end t, the angle of which is fifty-three degrees seven minutes and forty-eight seconds, which is equivalent to a one-half to one slope, will force the gauge-slides i and j apart against the action of the springs p and r so that each contact point will have been moved one-half the distance of the movement of the complementary slide s, and the total movements of the two contact points will equal the movement of the complementary slide, and thus an inside diameter may be measured by inserting my micrometer within the space to be measured and advancing the contact points m and n until they bear on each side of the surface.

When the rotation of the micrometer screw 5 is reversed, the complementary slide s will be retracted and the contact points m and n will be withdrawn by the pressure of the springs p and r against the exterior faces of the gauge-slides i and j.

The indicating devices provided on the handle of my micrometer comprise a bushing 11 mounted on the micrometer screw 5, and connected to the sleeve c by a fillet 12 and bolts 12ᵃ which are operated through a slot provided in the handle, sufficient space being left for the free movement of the sleeve and bushing over the walls of the handle.

The micrometer screw 5 is provided with 40 threads to the inch, and the upper end of the sleeve c is adapted to register with the transverse graduations 13 on the handle so that as the thimble d is rotated one complete turn, the sleeve c will move one graduation indicating a corresponding movement of the contact pins m and n of one fortieth or .25 of an inch.

The operating thimble d is graduated as at 14 into twenty-five equal divisions, and as the thimble is rotated one division, the contact pins m and n will have been advanced one twenty-fifth of .025 of an inch or .001 of an inch. The arrangement of the indicating devices on the end of the handle provide that a reading may be conveniently taken while the measurement is being made, which is a considerable advantage.

The broad contact surfaces provided by the wedge-end t and the interior faces of the gauge-slides i and j provide a positive action with no possibility of lost motion, and the broad contact surfaces also reduce the wear to a minimum, and in both instances, the limit of error is consequently reduced to a negligible point, where it need no longer be considered.

The sides of the V-shaped space formed by the oblique sides of the gauge-slides i and j form an angle equal to the angle of the wedge end so that as the wedge end is advanced between the gauge-slides i and j, each one will move an equal distance, and the adjacent surfaces will bear against each other at all points, and the indicating devices as before described are so arranged as to indicate the total movement of the two gauge-slides.

The parallel faces $i^2$ and $j^2$ allow the gauge-slides i and j to come more closely together and the notch 21 alined with and directly opposite the wedge-end t allows the complementary slide s to be advanced so that the gauge-slides i and j will be forced apart the full width of the complementary slide s, thus a maximum movement of the contact points are provided, and a greater measuring range is provided without substitution of the contact points $m'$ or $m^2$.

By providing a greater individual measuring range of my micrometer, and by providing substitute contact points of greater length, the convenience of my micrometer is greatly increased and one instrument will accomplish the work for which a set of several instruments was required before.

Referring now to Fig. 9, I show contact points 22 and 23 provided to be inserted in the extensions k and l which are pointed so that the depths of the threads or the total distance including the bottom of the threads may be measured.

I claim:

1. In an inside micrometer gauge, the combination of a hollow T-head, two companion gauge-slides located in the cross-piece of said T-head, said gauge slides provided with inner end portions adapted to be moved one past the other, whereby said companion gauge slides may be advanced and retracted and said inner ends further provided with oblique faces, respectively, adapted to form a V-shaped separation opening between said oblique faces at one side; a complementary slide, longitudinally movable in the stem of said T-head and provided with a wedge-end, rectangular in cross-section, said wedge-end bearing against said oblique inner-end faces of the gauge-slides and being adapted to move the gauge-slides proportionately to the movement imparted to the complementary slide, means for restraining the complementary slide to movement in a direction normal with the line of movement of said gauge slides, means for restraining the movement of the gauge-slides to a direction transverse to the direction of movement of said complementary slide, said gauge-slides provided with extensions projecting through the ends of said T-head, said extensions terminating in contact points, the springs normally holding the gauge-slides in retracted position and thereby their oblique inner-end faces in constant contact with the angular faces of said wedge-end of the complementary slide, and means for advancing and retracting the complementary slide.

2. In an inside micrometer gauge, the combination of, a hollow T-head, two companion gauge-slides located in the cross-piece of said T-head, said gauge-slides provided with inner end portions adapted to be moved one past the other, whereby said companion gauge slides may be advanced and retracted and said inner ends further provided with oblique faces, respectively, adapted to form a V-shaped separation opening between said oblique faces at one side; a complementary slide, longitudinally movable in the stem of said T-head and provided with a wedge-end, rectangular in cross-section, said wedge-end bearing against said oblique inner-end faces of the gauge-slides and being adapted to move the gauge-slides proportionately to the movement imparted to the complementary slide, means for restraining the complementary slide to movement in a direction normal with the line of movement of said gauge-slides, means for restraining the movement of the gauge-slides to a direction transverse to the direction of movement of said complementary slide, said gauge-slides provided with extensions projecting through the ends of said T-head, said extensions adapted to have contact-points removably mounted thereon, springs normally holding the gauge-slides in retracted position and thereby their oblique inner-end faces in constant contact with the angular faces of said wedge-end of the complementary slide, and means for advancing and retracting the complementary slide.

3. In an inside micrometer gauge, the combination of a hollow T-head, two companion gauge-slides located in the cross-piece of said T-head, said gauge-slides provided with inner end portions adapted to be moved one past the other, whereby said companion gauge-slides may be advanced and retracted and said inner ends further provided with oblique faces, respectively, adapted to form a V-shaped separation opening between said oblique faces at one side, a complementary slide, longitudinally movable in the stem of said T-head and provided with a wedge-end, rectangular in cross-section, said wedge-end bearing against said oblique inner-end faces of the gauge-slides and being adapted to move the gauge-slides proportionately to the movement imparted to the complementary slide, means for restraining the complementary slide to movement in a direction normal with the line of movement of said gauge-slides, means for restraining the movement of the gauge-slides to a direction transverse to the direction of movement of said complementary slide, said gauge-slides provided with extensions projecting through the ends of said T-head, said extensions adapted to have contact-points removably mounted thereon, a plurality of contact points of varying length adapted to be interchangeably mounted on said extensions, springs normally holding the gauge-slides in retracted position and thereby their oblique inner-end faces in constant contact with the angular faces of said wedge-end of the complementary slide, and means for advancing and retracting the complementary slide.

4. In an inside micrometer gauge, the combination of a hollow T-head, two companion gauge-slides located in the cross-piece of said T-head, said gauge-slides provided with inner end portions adapted to be moved one past the other, whereby said companion gauge-slides may be advanced and retracted and said inner ends further provided with oblique faces, respectively, adapted to form a V-shaped separation opening between said oblique faces at one side, a complementary slide, longitudinally movable in the stem of said T-head and provided with a wedge-end, rectangular in cross-section, said wedge-end bearing against said oblique inner-end faces of the gauge-slides and being adapted to move the gauge-slides proportionately to the movement imparted to the complementary slide, means for restraining the complementary slide to movement in a direction normal with the line of movement of said gauge-slides, means for restraining the movement of the gauge-slides to a direction transverse to the direction of movement of said complementary slide, said gauge-slides provided with hollow extensions projecting through the ends of said T-head, said extensions adapted to have contact-points removably mounted thereon, springs normally holding the gauge-slides in retracted position and thereby their oblique inner-end faces in constant contact with the angular faces of said wedge-end of the complementary slide, and means for advancing and retracting the complementary slide.

5. In an inside micrometer gauge, the combination of a hollow T-head, two companion gauge-slides located in the cross-piece of said T-head, said gauge-slides provided with inner end portions adapted to be moved one past the other, whereby said companion gauge slides, may be advanced and retracted and said inner ends further provided with oblique faces, respectively, adapted to form a V-shaped separation opening between said oblique faces at one side, a complementary slide, longitudinally movable in the stem of said T-head and provided with a wedge-end, rectangular in cross-section, said wedge-end bearing against said oblique inner-end faces of the gauge-slides and being adapted to move the gauge-slides proportionately to the movement imparted to the complementary slide, means for restraining the complementary slide to movement in a direction normal with the line of movement of said gauge-slides, means for restraining the movement of the gauge-slides to a direction transverse to the direction of movement of said complementary slide, said gauge-slides provided with extensions projecting through the ends of said T-head, said extensions terminating in contact points, coil springs mounted on said extensions of the gauge-slides within said T-head, normally holding the gauge-slides in retracted position and thereby their oblique inner-end faces in constant contact with the angular faces of said wedge-end of the complementary slide, and means for advancing and retracting the complementary slide.

6. In an inside micrometer gauge, the combination of a hollow T-head, two companion gauge slides located in the cross-piece of said T-head, said gauge-slides provided with inner end portions adapted to be moved one past the other, whereby said companion gauge slides may be advanced and retracted and said inner ends further provided with oblique faces, respectively, adapted to form a V-shaped separation opening between said oblique faces at one side, a complementary slide, longitudinally movable in the stem of said T-head and provided with a wedge-end, rectangular in cross-section, said wedge-end bearing against said oblique inner-end faces of the gauge-slides and being adapted to move the gauge-slides proportionately to the movement imparted to the complementary slide, the T-head having removable side walls, these side walls and the complementary slide being provided with cooperating means for restraining the movement of the latter in a direction normal with the line of movement of said gauge-slides, the movement of the gauge-slides being restrained to a direction transverse to the direction of movement of said complementary slide, said gauge-slides provided with extensions projecting through the ends of said T-head, said extensions terminating in contact points, springs normally holding the gauge-slides in retracted position and thereby their oblique inner-end faces in constant contact with the angular faces of said wedge-end of the complementary slide, and means for advancing and retracting the complementary slide.

7. In an inside micrometer gauge, the combination of a hollow T-head, two companion gauge-slides located in the cross-piece of said T-head, said gauge-slides provided with tongue and groove at their inner ends, respectively, and said inner ends further provided with oblique faces, respectively, adapted to form a V-shaped separation opening between said oblique face at one side, a complementary slide, longitudinally movable in the stem of said T-head and provided with a wedge-end, rectangular in cross-section, said wedge-end bearing against said oblique inner-end faces of the gauge-slides and being adapted to move the gauge-slides proportionately to the movement imparted to the complementary slide, means for restraining the complementary slide to movement in a direction normal with the line of movement of said gauge-slides, means for restraining the movement of the gauge-slides to a direction transverse to the direction of movement of said complementary slide, said gauge-slides provided with extensions projecting through the ends of said T-head, said extensions terminating in contact points, springs normally holding the gauge-slides in retracted position and thereby their oblique inner-end faces in constant contact with the angular faces of said wedge-end of the complementary slide, and means for advancing and retracting the complementary slide.

8. In an inside micrometer gauge, the combination of a hollow T-head, two companion gauge-slides located in the cross-piece of said T-head, said gauge-slides provided with inner end portions adapted to be moved one past the other, whereby said companion gauge slides may be advanced and retracted and said inner ends further provided with oblique faces, respectively, adapted to form a V-shaped separation opening between said oblique faces at one side, a complementary slide, longitudinally movable in the stem of said T-head and provided with a wedge-end, rectangular in cross-section, said wedge-end bearing against said oblique inner-end faces of the gauge-slides and being adapted to move the gauge-slides proportionately to the movement imparted to the complementary slide, means for restraining the complementary slide to movement in a direction normal with the line of movement of the said gauge-slides, means for restraining the movement of the gauge-slides to a direction transverse to the direction of movement of said complementary slide, said gauge-slides provided with extensions projecting through the ends of said T-head, said extensions terminating in tapered contact points, springs normally holding the gauge-slides in retracted position and thereby their oblique inner-end faces in constant contact with the angular faces of said wedge-end of the complementary slide, and means for advancing and retracting the complementary slide.

9. In an inside micrometer gauge, the combination of a hollow T-head, two companion gauge-slides located in the cross-piece of said T-head said gauge-slides provided with inner end portions adapted to be moved one past the other, whereby said companion gauge slides may be advanced and retracted, and said inner ends further provided with oblique faces of substantial width, respectively, adapted to form a V-shaped separation opening between said oblique faces at one side; a complementary slide, longitudinally movable in the stem of said T-head and provided with a wedge-end of substantial width bearing against said oblique inner-end faces of the gauge-slides and being adapted to move the gauge-slides proportionately to the movement imparted to the complementary slide, said gauge-slides provided with extensions projecting through the ends of said T-head, said extensions terminating in contact points, the springs normally holding the gauge-slides in retracted position and thereby their oblique inner-end faces in constant contact with the angular faces of said wedge-end of the complementary slide, and means for advancing and retracting the complementary slide.

10. In an inside micrometer gauge, the combination of a hollow T-head; two companion guage-slides located in the cross-piece of said T-head, said gauge-slides provided with inner end portions adapted to be moved one past the other, whereby the said companion gauge-slides may be advanced or retracted and said inner ends further provide with oblique faces, respectively, adapted to form a V-shaped separation opening between said oblique faces at one side, and a complementary slide, longitudinally movable in the stem of said T-head and provided with a wedge-end, rectangular in cross-section, said wedge-end bearing against said oblique inner-end faces of the gauge-slides and being adapted to move the gauge-slides proportionately to the movement imparted to the complementary slide.

CHARLES A. CLASE.